(12) United States Patent
Sano et al.

(10) Patent No.: US 11,117,542 B2
(45) Date of Patent: Sep. 14, 2021

(54) COVERING MEMBER AND AIRBAG APPARATUS

(71) Applicant: NIHON PLAST CO., LTD., Shizuoka (JP)

(72) Inventors: Kei Sano, Shizuoka (JP); Ryosuke Muramatsu, Kanagawa (JP); Shoji Sugiyama, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 77 days.

(21) Appl. No.: 16/569,714

(22) Filed: Sep. 13, 2019

(65) Prior Publication Data
US 2020/0101926 A1    Apr. 2, 2020

(30) Foreign Application Priority Data

Sep. 27, 2018  (JP) .............................. JP2018-182126

(51) Int. Cl.
*B60R 21/2165* (2011.01)
*B60R 21/276* (2006.01)

(52) U.S. Cl.
CPC ........ *B60R 21/2165* (2013.01); *B60R 21/276* (2013.01); *B60R 2021/2765* (2013.01)

(58) Field of Classification Search
CPC .............. B60R 21/2165; B60R 21/276; B60R 2021/2765; B60R 2021/23384; B60R 2021/2338; B60R 2021/23386
See application file for complete search history.

(56) References Cited

U.S. PATENT DOCUMENTS

| 9,776,591 | B1* | 10/2017 | Jeong | ................... B60R 21/2338 |
| 2005/0212273 | A1* | 9/2005 | Thomas | ................ B60R 21/276 280/739 |
| 2007/0102911 | A1* | 5/2007 | Hall | ..................... B60R 21/2338 280/739 |
| 2010/0187797 | A1* | 7/2010 | Debler | ................ B60R 21/2338 280/737 |

FOREIGN PATENT DOCUMENTS

JP        2008-143509 A        6/2008

* cited by examiner

*Primary Examiner* — Paul N Dickson
*Assistant Examiner* — Scott F. Underwood
(74) *Attorney, Agent, or Firm* — Brundidge & Stanger, P.C.

(57) ABSTRACT

A covering member is attached to a case body, on which an actuator detachably holding the other end portion of a tether having one end portion connected to an airbag is mounted, and covers the actuator. The covering member includes an opposing portion that opposes at least a part of the actuator in an attachment direction D to the case body. The covering member includes a side surface portion that is formed to extend from the opposing portion in the attachment direction D and is locked and held by being pushed into the case body in the attachment direction D.

7 Claims, 7 Drawing Sheets

COVERING MEMBER AND AIRBAG APPARATUS

CROSS REFERENCE TO RELATED APPLICATIONS

The disclosure of Japanese Patent Application No. 2018-182126 filed on Sep. 27, 2018 including the specification, drawings and abstract is incorporated herein by reference in its entirety.

TECHNICAL FIELD

The present invention relates to a covering member that is attached to a counterpart member, on which an actuator is mounted, and covers the actuator and an airbag apparatus including the covering member.

BACKGROUND ART

An airbag apparatus provided in a driver's seat or a passenger seat of a vehicle such as an automobile is widely known as the related art. In such an airbag apparatus, an internal pressure of an airbag can be controlled according to a physical status or a sitting state of an occupant, who is a protection target. In such an airbag apparatus, it is possible to control the internal pressure of the airbag, for example, by adjusting opening or closing of a lid of a variable vent hole provided in the airbag, that is, tension of a tether which is a connecting member having one end portion connected to the lid. The other end portion of the tether is led out from an opening provided in the airbag to the outside of the airbag, and is locked and held by the actuator. By a control apparatus controlling the actuator, the other end portion of the tether locked in the actuator is switched to a locked state or a locking released state. Accordingly, by changing an open or close amount of the lid of the variable vent hole, a gas discharge amount is controlled, and thus the internal pressure of the airbag is controlled (refer to PTL 1).

CITATION LIST

Patent Literature

PTL 1
Japanese Patent Application Laid-Open No. 2008-143509 (Page 9-10, FIG. 5)

SUMMARY OF INVENTION

Technical Problem

The actuator is mounted on a bottom portion of a case body accommodating the airbag of the airbag apparatus. Since the actuator is exposed to the outside of the case body in this state, it is preferable for the actuator to be protected by the cover body. Therefore, it is desirable that the cover body can be easily attached to the actuator.

An object of the present invention is to provide a covering member that is easily and reliably attached to a counterpart member on which an actuator is mounted and can protect the actuator and an airbag apparatus including the covering member.

Solution to Problem

According to claim 1, there is provided a covering member that is attached to a counterpart member, on which an actuator detachably holding one end portion of a connecting member having the other end portion connected to an airbag is mounted, and covers the actuator. The covering member includes an opposing portion that opposes at least a part of the actuator in an attachment direction to the counterpart member and a side surface portion that is formed to extend from the opposing portion in the attachment direction and is locked and held by being pushed into the counterpart member in the attachment direction.

According to the covering member of claim 2, in the covering member of claim 1, the side surface portion is pressed against the counterpart member in a direction intersecting the attachment direction.

According to the covering member of claim 3, in the covering member of claim 2, the side surface portion includes a narrowing portion that narrows in the direction intersecting the attachment direction and is pressed against the counterpart member.

According to the covering member of claim 4, in the covering member of claim 2, the side surface portion includes a hole portion that is engaged with a claw section projecting on the counterpart member along the direction intersecting the attachment direction.

According to the covering member of claim 5, in the covering member of claim 4, the side surface portion includes slits at positions interposing the hole portion therebetween.

According to the covering member of claim 6, in the covering member of claim 5, the slit is formed from a tip portion of the side surface portion in the attachment direction, and is fitted to a guide portion provided in the counterpart member along the attachment direction.

According to the covering member of claim 7, in the covering member of claim 1, a viewing window portion formed in the opposing portion along a direction intersecting the other end portion of the connecting member is further included.

According to claim 8, there is provided an airbag apparatus including an airbag, a case body that is a counterpart member accommodating the folded airbag, an actuator that is mounted on the case body, and the covering member according to claim 1, which covers the actuator and is attached to the case body.

Advantageous Effects of Invention

In the covering member of claim 1, since the side surface portion is locked and held by being pushed into the counterpart member in the attachment direction, the covering member can be easily and reliably attached to the counterpart member on which the actuator is mounted, and the actuator can be protected by the opposing portion covering at least a part of the actuator.

In the covering member of claim 2, in addition to the effect of the covering member of claim 1, the covering member can be more firmly held by the counterpart member by the side surface portion being pressed against the counterpart member in the direction intersecting the attachment direction.

In the covering member of claim 3, in addition to the effect of the covering member of claim 2, the covering member can be more firmly incorporated into the counterpart member by the narrowing portion of the side surface portion being pressed against the counterpart member.

In the covering member of claim 4, in addition to the effect of the covering member of claim 2, the covering member can be more firmly held by the counterpart member with respect to a deployment pressure of the airbag by providing the hole portion, which is engaged with the claw section projecting on the counterpart member along the direction intersecting the attachment direction, in the side surface portion.

In the covering member of claim 5, in addition to the effect of the covering member of claim 4, it is possible to suppress the deformation of other portions of the covering member and to more easily attach the covering member since it is possible for the side surface portion pushed in the counterpart member in the attachment direction to easily and elastically deform at the position including the hole portion at the time of attachment of the covering member by providing the slit at the position where the hole portion of the side surface portion is interposed.

In the covering member of claim 6, in addition to the effect of the covering member of claim 5, by forming the slit from the tip portion of the side surface portion along the attachment direction and fitting the slit to the guide portion of the counterpart member, the covering member is easily positioned with respect to the counterpart member when attaching the covering member to the counterpart member due to the fitting between the slit and the guide portion, is guided in the attachment direction, and thus can be more easily attached.

In the covering member of claim 7, in addition to the effect of the covering member of claim 1, the other end portion of the connecting member can be easily checked visually via the viewing window portion by forming the viewing window portion in the opposing portion along the direction intersecting the other end portion of the connecting member.

In the airbag apparatus of claim 8, the actuator can be reliably protected by the covering member of claim 1 being included.

DESCRIPTION OF EMBODIMENTS

Hereinafter, Embodiment 1 of the present invention will be described with reference to the drawings.

Figure 8:
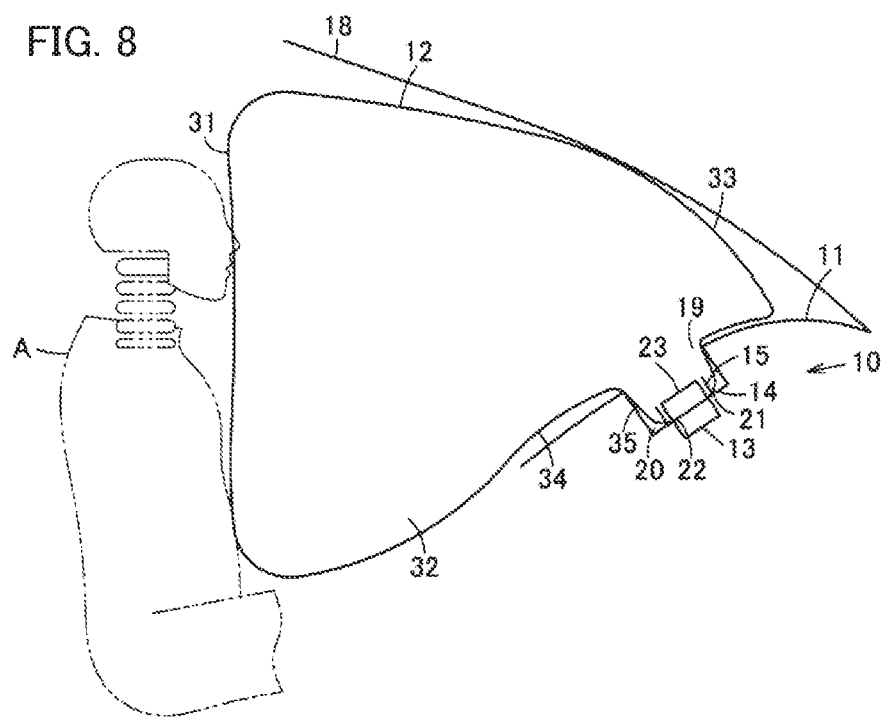
FIG. 8 is a side view schematically illustrating a deployed state of an airbag of the airbag apparatus.

In FIG. 8, 10 indicates an airbag apparatus. In the embodiment, this airbag apparatus 10 is an airbag apparatus for a passenger seat occupant, which is mounted on an automobile that is an example of a vehicle. Airbag apparatus 10 is disposed inside instrument panel section 11 positioned in front of occupant A sitting in an automobile passenger seat. Hereinafter, each of a front-and-rear direction, both side directions, and an up-and-down direction will be described with a forward traveling direction of the automobile, which is in a state where airbag apparatus 10 is attached to the automobile, as reference.

This airbag apparatus 10 includes bag-shaped airbag 12 configured with a single or a plurality of base cloths, inflator 13 that supplies a gas to airbag 12, case body 14, and retainer 15. Case body 14 is a counterpart member to which airbag 12 and inflator 13 are attached. Airbag 12 which is yet to be deployed is covered with a cover body (not illustrated). Airbag apparatus 10 is configured to be electrically connected to a control apparatus (not illustrated) including a sensor. Operation of inflator 13 is controlled by the control apparatus.

Case body 14 is formed in a substantially box shape. On a front side of case body 14, or an upper side facing windshield 18 which is continuous above instrument panel section 11, there is rectangular protruding opening 19 which is an opening portion. Inside case body 14, there is airbag accommodating portion 20 that accommodates folded airbag 12. In addition, attachment hole 22 for attaching inflator 13 is formed in bottom portion 21 of case body 14. Protruding opening 19 is covered with the cover body at normal times.

Inflator 13 includes, for example, disk-shaped main body portion 23. A flange portion projects on an outer side of main body portion 23 of inflator 13, and a through-hole is formed in the flange portion. In an upper portion of main body portion 23, that is, the upper side of the flange portion, and in an outer peripheral surface of main body portion 23, a plurality of gas ejection ports (not illustrated) are formed. An igniter and a chemical are accommodated inside main body portion 23. An electric signal from the control apparatus, which is transmitted via a connector connected to the bottom portion, causes the igniter to combust the chemical, and a gas for inflation is rapidly supplied from the gas ejection ports. Inflator 13 is attached to bottom portion 21 of case body 14 in a state where main body portion 23 in which the gas ejection ports are formed is inserted in airbag 12. A shape of inflator 13 is not limited to such a shape. For example, a configuration where cylindrical main body portion 23 is disposed inside airbag 12 can also be adopted.

Retainer 15 is formed in a frame shape. An attachment bolt (stud bolt) (not illustrated) for attaching inflator 13 to the bottom portion of case body 14 along with airbag 12 projects in retainer 15.

The cover body is formed of a resin integrally with or separately from instrument panel section 11. In the cover body, a tear line, which is thinner and can rupture more easily than other portions, is formed in a substantially H-shape in plan view.

Airbag 12 has occupant restraining surface portion 31, which opposes occupant A in a deployed state, in a rear end portion. In addition, in the embodiment, airbag 12 has bag side surface portions 32 that extend along the front-and-rear direction toward an opposite side to an occupant side, in other words, the front such that the bag side surface portions are connected to both sides of occupant restraining surface portion 31. Bag upper surface portion 33 extending along the front-and-rear direction is provided such that the bag upper surface portion is connected to occupant restraining surface portion 31 and upper portions of bag side surface portions 32 on both sides. Bag lower surface portion 34 extending along the front-and-rear direction is provided such that the bag lower surface portion is connected to occupant restraining surface portion 31 and lower portions of both of bag side surface portions 32. Airbag 12 further includes gas introduction portion 35, through which a gas from inflator 13 is introduced, in a front end portion thereof. It is sufficient for airbag 12 to have at least occupant restraining surface portion 31, and a shape thereof is not limited to the shape described above. The shape of airbag 12 may be any shape according to a shape of a restraining target or a provision position.

Occupant restraining surface portion 31 is a portion that applies reaction force to occupant A who has moved to the front at the time of automobile collision and restrains occupant A in a state where airbag 12 is deployed.

Each bag side surface portion 32 does not directly oppose occupant A in a state where airbag 12 is deployed. Each bag side surface portion 32 is a portion configured with a surface that is deployed in both side directions of airbag 12.

Bag upper surface portion 33 is a portion that opposes windshield 18 in a state where airbag 12 is deployed. Bag upper surface portion 33 opposes an upper surface of bag lower surface portion 34.

In a state where airbag 12 is deployed, bag lower surface portion 34, which is in a state of protruding downwards, is connected to lower sides of occupant restraining surface portion 31 and both of bag side surface portions 32. That is, bag lower surface portion 34 is formed in a shape bulging downwards.

Gas introduction portion 35 is a portion through which a gas ejected from the gas ejection ports of inflator 13 is supplied into airbag 12. Gas introduction portion 35 is provided at a position opposing a front side of airbag 12, that is, instrument panel section 11 of airbag 12. Gas introduction portion 35 is an opening portion that is open to, for example, bag lower surface portion 34. A peripheral edge portion of gas introduction portion 35 is integrally fixed to airbag accommodating portion 20 of case body 14 along with inflator 13.

Figure 2A:
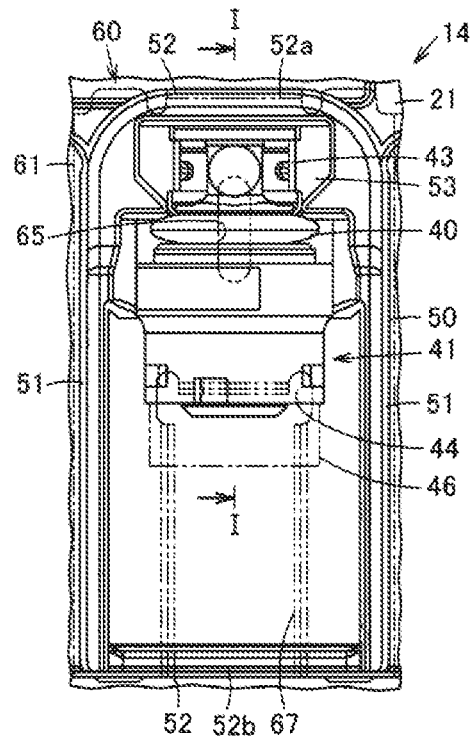
FIG. 2A is a plan view illustrating a part of the airbag apparatus.
Figure 2B:
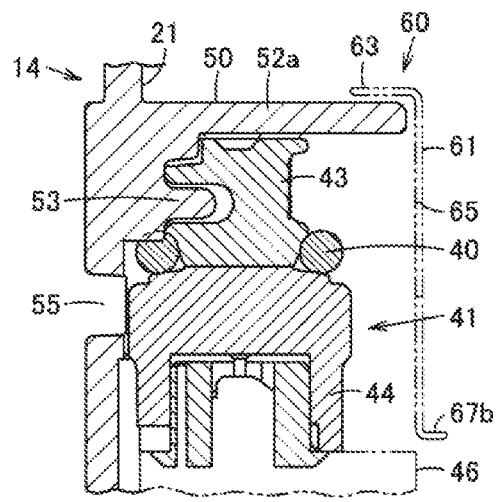
FIG. 2B is a sectional view taken along a position corresponding to I-I of FIG. 2A.
Figure 6A:
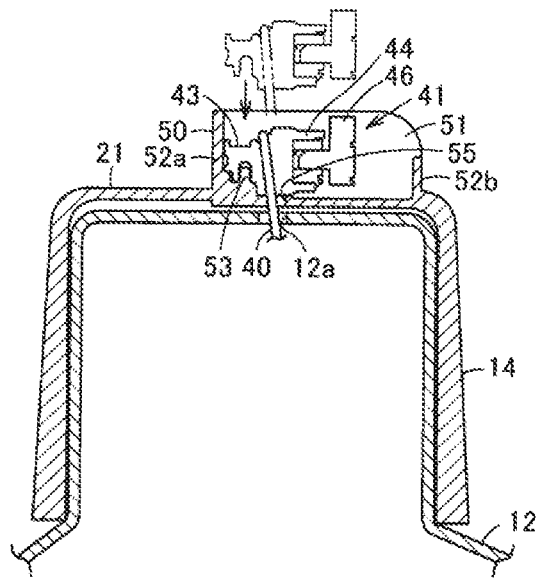
FIG. 6A is a sectional view schematically illustrating the operation of attaching the actuator to the case body.

One end portion of tether 40, which is a connecting member illustrated in FIGS. 2A and 2B, is connected to airbag 12. Tether 40 is formed of a single or a plurality of base cloths, in a flap shape (strip shape) as a whole. Tether 40 is a longitudinal member. As illustrated in FIG. 6A, the one end portion of tether 40 is inserted in opening 12a formed in airbag 12 and is positioned inside airbag 12. In addition, the one end portion of tether 40 is fixed to, for example, a lid body of a variable vent hole formed in bag side surface portions 32 (FIG. 8) of airbag 12 or a back surface side of occupant restraining surface portion 31 (FIG. 8) of airbag 12. Accordingly, tether 40 acts as an inflation control member for controlling an internal pressure or an inflated shape of airbag 12 in a state where airbag 12 (FIG. 8) is deployed. That is, the one end portion of tether 40 is connected to airbag 12.

Figure 1:
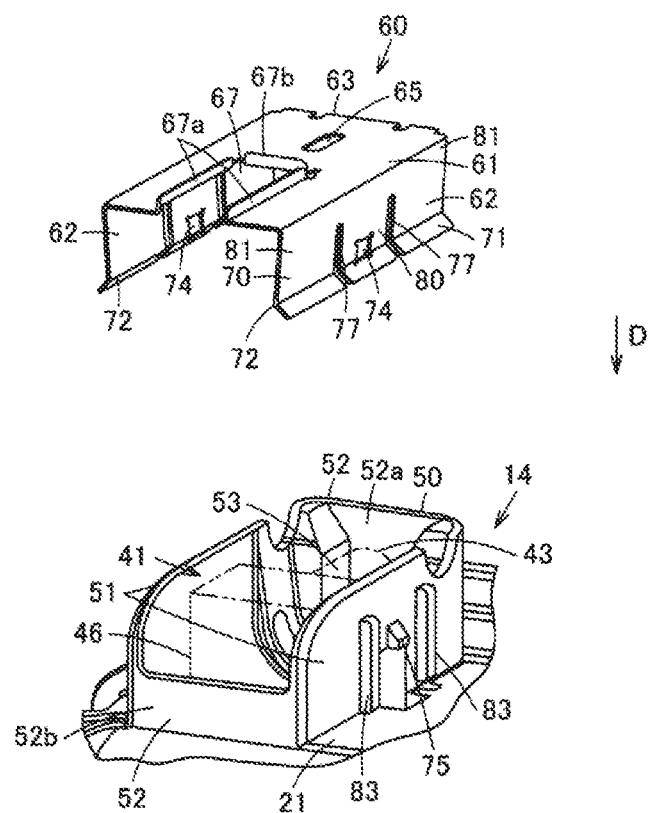
FIG. 1 is an exploded perspective view illustrating a part of an airbag apparatus including a covering member according to Embodiment 1 of the present invention.
Figure 3:
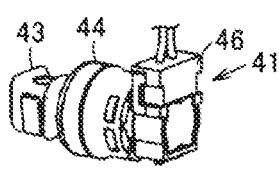
FIG. 3 is a perspective view illustrating an actuator of the airbag apparatus.
Figure 4A:
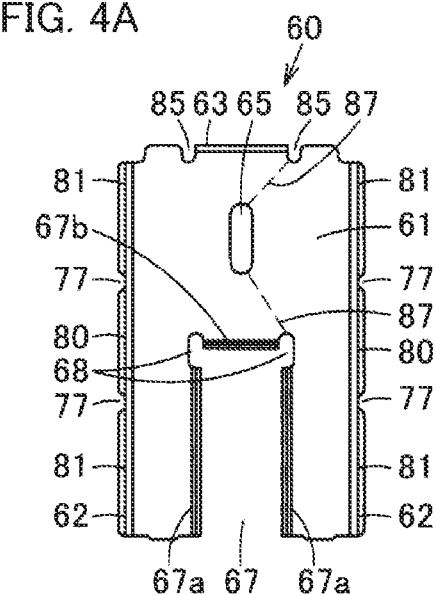
FIG. 4A is a plan view of the covering member.
Figure 4B:
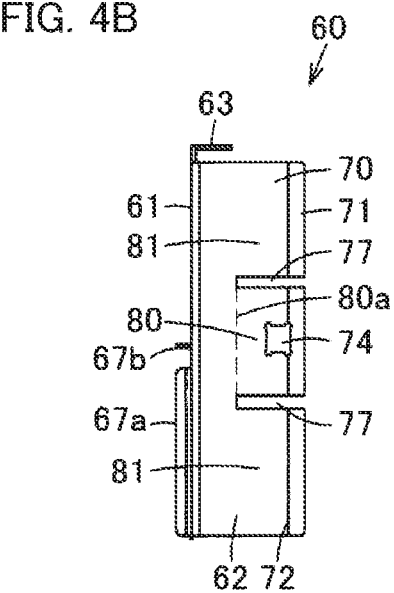
FIG. 4B is a side view of the covering member.
Figure 5:
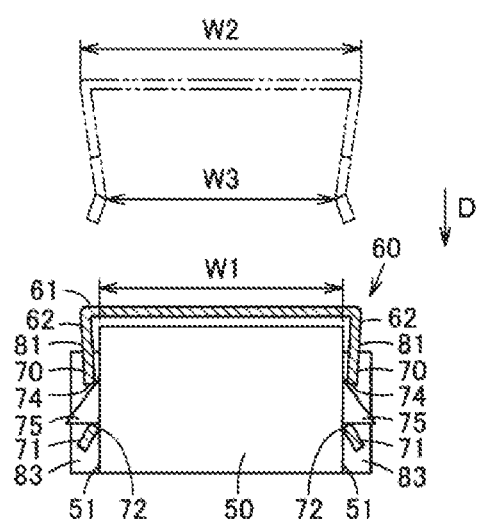
FIG. 5 is a sectional view schematically illustrating an operation of attaching the actuator to a case body.

In addition, the other end portion of tether 40 is formed in, for example, a loop shape, and is held by actuator 41 illustrated in FIGS. 1 to 3. Actuator 41 includes fixed portion 43 and variable portion 44 in both end portions thereof. Fixed portion 43 and variable portion 44 are formed to be separable from each other. Fixed portion 43 is a portion relatively fixed to case body 14. Variable portion 44 is a portion variable with respect to case body 14. The other end portion of tether 40 is hooked at a position of connection between fixed portion 43 and variable portion 44. Wiring member 46 such as a harness electrically connected to the control apparatus is detachably connected to variable portion 44.

Figure 7:
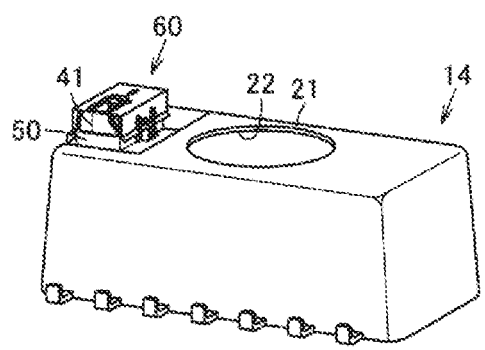
FIG. 7 is a perspective view illustrating the case body to which the covering member is attached.

Actuator 41 is mounted on, for example, case body 14. In the embodiment, actuator 41 is mounted on actuator mounted portion 50 (hereinafter, simply referred to as mounted portion 50) formed on an outer side of bottom portion 21 of case body 14. Mounted portion 50 includes side wall portions 51 and 51, which are assembly portions disposed to be separated away from each other, and end wall portions 52 and 52 formed to be connected to side wall portions 51 and 51. That is, mounted portion 50 is formed to be surrounded by side wall portions 51 and 51 and end wall portions 52 and 52 in a quadrilateral shape. For example, mounted portion 50 is provided to be separated away to the side of attachment hole 22 (FIG. 7) in bottom portion 21 of case body 14. In mounted portion 50 in the embodiment, side wall portions 51 and 51 are disposed to separated away from each other in a car width direction, that is, a right-and-left direction, and end wall portions 52 and 52 are disposed to separated away from each other in the front-and-rear direction. Mounted portion 50 is positioned to be biased to a side edge of case body 14. In the embodiment, holding section 53 that holds actuator 41 is formed in mounted portion 50. Leading-out port 55 for leading the other end portion of tether 40 from case body 14 to the outside is formed in mounted portion 50 to penetrate bottom portion 21. Mounted portion 50 may be any shape that allows actuator 41 to be mounted thereon.

Each side wall portion 51 is provided to protrude from bottom portion 21 of case body 14 in a direction of separating away from airbag 12, that is, to a lower side.

Just as each side wall portion 51, each end wall portion 52 is provided to protrude from bottom portion 21 of case body 14 in the direction of separating away from airbag 12, that is, to the lower side. One end wall portion 52a, which is close to a center side of the front-and-rear direction of case body 14, has, for example, a height dimension substantially equal to side wall portion 51, and is connected between side wall portions 51 and 51. In addition, the other end wall portion 52b, which is close to an external portion side of case body 14 in the front-and-rear direction of case body 14, is set to have a height dimension smaller than each side wall portion 51 and one end wall portion 52a, and is connected between side wall portions 51 and 51.

Holding section 53 is formed at a position surrounded by one end wall portion 52a and side wall portions 51 and 51. Holding section 53 is formed to have unevenness in the up-and-down direction. Fixed portion 43 of actuator 41 is fitted to holding section 53. Accordingly, actuator 41 is held by holding section 53, and a position of actuator 41 is fixed to case body 14 (mounted portion 50).

In addition, actuator 41 mounted on mounted portion 50 is covered with covering member 60 illustrated in FIGS. 1, 2A, 2B, 4A, 4B, and 5. Covering member 60 is a protective member that covers and protects actuator 41. Covering member 60 integrally has opposing portion 61 that opposes actuator 41 and side surface portions 62 extending from opposing portion 61. In addition, preferably, covering member 60 further integrally has end surface portion 63 extending from opposing portion 61. In the embodiment, covering member 60 is, for example, a cover body formed of a metal sheet.

Opposing portion 61 is a surface-like portion formed in a flat plate shape having a thickness in the up-and-down direction. Opposing portion 61 has a shape according to the shape of mounted portion 50. In the embodiment, opposing portion 61 has, for example, a quadrilateral shape, and a longitudinal direction of opposing portion 61 matches the front-and-rear direction. Opposing portion 61 has width dimension W2 larger than dimension W1 between outer surfaces of side wall portions 51 and 51 of mounted portion 50. In the embodiment, opposing portion 61 has a longitudinal dimension which is substantially equal to a dimension between end wall portions 52 and 52 or larger than the dimension between end wall portions 52 and 52. In opposing portion 61, viewing window portion 65 is formed to penetrate opposing portion 61. Viewing window portion 65 is a window portion that allows the other end portion of tether 40 held by actuator 41 to be seen from outside covering member 60. In the embodiment, viewing window portion 65 is open at a position close to the front of opposing portion 61. Viewing window portion 65 is formed along a direction intersecting the other end portion of tether 40 held by actuator 41. That is, in the embodiment, viewing window portion 65 is formed to have a long hole shape of which a longitudinal direction matches the front-and-rear direction.

In addition, opening portion 67 is formed in opposing portion 61. Opening portion 67 is a portion to which wiring member 46 connected to actuator 41 is inserted. Opening portion 67 communicates with an end portion of opposing portion 61, and is notched along the longitudinal direction of opposing portion 61. That is, opening portion 67 has both side edges 67a and 67a and one edge 67b, and a side where both side edges 67a and 67a and one edge 67b are not formed is open. In addition, both side edges 67a and 67a and one edge 67b of opposing portion 61 are formed in a rib portion that is bent and raised for the sake of reinforcement. For this reason, bent recess portions 68 for crack prevention at the time of bending are notched continuously to opening portion 67 at positions where both side edges 67a and 67a and one edge 67b of opening portion 67 are connected to each other. In the embodiment, opening portion 67 is positioned in a middle portion in a width direction of opposing portion 61.

Side surface portions 62 each extend from both sides of opposing portion 61 to a case body 14 side, that is, along attachment direction D to case body 14 of covering member 60. Side surface portions 62 and 62 are disposed to be separated away from each other in the right-and-left direction. Side surface portions 62 and 62 are portions that oppose outer sides of side wall portions 51 and 51 in a state where covering member 60 is attached to case body 14 (mounted portion 50). In the embodiment, each side surface portion 62 integrally has side surface base end portion 70 connected to opposing portion 61 in an inclined manner and side surface tip portion 71 connected to side surface base end portion 70 in an inclined manner at a lower end portion of side surface base end portion 70. Side surface base end portion 70 is inclined to a middle side in the width direction of opposing portion 61, that is, an inner side with respect to the up-and-down direction orthogonal to opposing portion 61. That is, side surface base end portions 70 and 70 each are inclined to form an acute angle with respect to opposing portion 61. In addition, side surface tip portion 71 is inclined to an opposite side to the middle in the width direction of opposing portion 61, that is, an outer side with respect to the up-and-down direction orthogonal to opposing portion 61. For this reason, each side surface portion 62 has, at a position where side surface base end portion 70 is connected to side surface tip portion 71, narrowing portion 72 that narrows inwards, that is, to each side of side wall portions 51 and 51 of mounted portion 50. At a position of narrowing portion 72, a dimension between side surface portions 62 and 62 is width dimension W3 smaller than dimension W1 between the outer surfaces of side wall portions 51 and 51. That is, side surface portions 62 and 62 strongly hit against side wall portions 51 and 51 at the positions of narrowing portions 72 and 72. Accordingly, side surface portions 62 and 62 are pressed against side wall portions 51 and 51 of case body 14 in a width direction, which is a direction intersecting attachment direction D to case body 14 (mounted portion 50) of covering member 60. In other words, when attaching covering member 60 to case body 14 (mounted portion 50), side surface portions 62 and 62 warp such that case body 14 (mounted portion 50) is interposed therebetween.

Hole portion 74 is open in each side surface portion 62. Hole portion 74 is formed in narrowing portion 72 of side surface portion 62. That is, hole portion 74 is open over side surface base end portion 70 and side surface tip portion 71. In the embodiment, hole portion 74 is disposed in a substantially middle portion in a longitudinal direction of side surface portion 62. That is, in the embodiment, hole portion 74 is positioned on the side of opening portion 67. In addition, hole portion 74 is formed in, for example, a quadrilateral shape. Claw section 75 provided in case body 14 is engaged with hole portion 74. From a tip side to a base end side of side wall portion 51, claw section 75 is formed to gradually protrude more from side wall portion 51.

Slits 77 are formed in each side surface portion 62. Slits 77 are respectively formed at positions where hole portion 74 is interposed therebetween. That is, two slits 77 are formed for each one of side surface portions 62. Slits 77 are formed to communicate with a tip portion of side surface portion 62 (lower end portion) and extend to a base end portion (upper end portion). That is, slits 77 are formed from side surface tip portion 71 to side surface base end portion 70. In addition, in the embodiment, slits 77 are linearly formed along attachment direction D to case body 14 (mounted portion 50) of covering member 60. Slits 77 and 77 divide each tip portion side of side surface portion 62 into first side surface portion 80 positioned between slits 77 and 77 and second side surface portions 81 and 81 positioned on opposite sides to first side surface portion 80 with respect to slits 77 and 77. Although base end portion sides of first side surface portion 80 and second side surface portions 81 and 81 are integrally connected to each other in the embodiment, the base end portion sides may be divided in a tongue shape from tip portions to base end portions by each of slits 77 and 77 being formed to extend to the vicinity of opposing portion 61.

First side surface portion 80 is a portion that has hole portion 74 positioned therein, and warps and deforms along claw section 75 when attaching covering member 60 to case body 14 (mounted portion 50). That is, warping which occurs when attaching covering member 60 to case body 14 (mounted portion 50) is more significant in first side surface portion 80 than in second side surface portions 81 and 81. First side surface portion 80 is a portion that warps most in side surface portion 62. The base end portion of first side surface portion 80, that is, between tip portions of slits 77 and 77 is warping portion 80a when first side surface portion 80 warps.

Second side surface portions 81 and 81 each are a portion that warps and deforms along the outer surface of side wall portion 51 when attaching covering member 60 to case body 14 (mounted portion 50). That is, warping which occurs when attaching covering member 60 to case body 14 (mounted portion 50) is slighter in second side surface portions 81 and 81 than in first side surface portion 80.

In addition, when attaching covering member 60 to case body 14 (mounted portion 50), each slit 77 is fitted to each guide portion 83 provided in case body 14. Guide portion 83 is provided to protrude to side wall portion 51. In the embodiment, guide portion 83 is a rib that is linearly formed along attachment direction D to case body 14 (mounted portion 50) of covering member 60, that is, along the up-and-down direction. Guide portions 83 are formed at positions where claw section 75 is interposed therebetween. In addition, guide portion 83 is set to protrude less from side wall portion 51 than claw section 75 is.

End surface portion 63 is a portion that opposes an outer side of one end wall portion 52 in a state where covering member 60 is attached to case body 14 (mounted portion 50). End surface portion 63 is bent from opposing portion 61 in the same direction as side surface portion 62, that is, a direction facing case body 14, and thus is formed in a tongue shape. Bent recess portions 85 for crack prevention at the time of bending are notched on both sides of end surface portion 63. This end surface portion 63 is not an indispensable configuration.

Figure 6B:
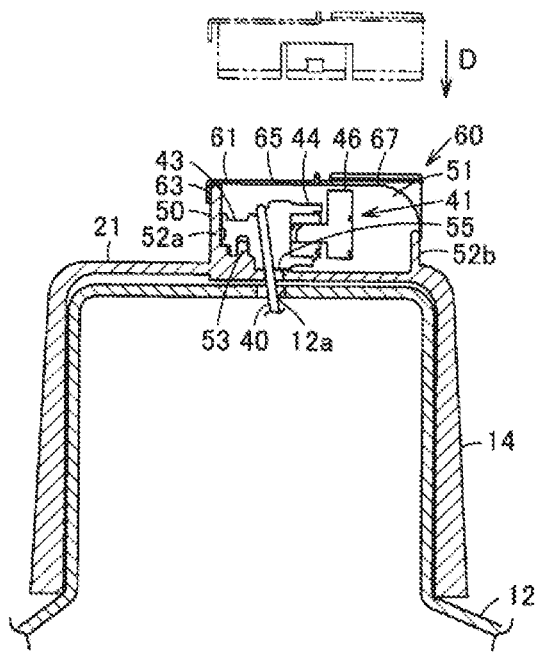
FIG. 6B is a sectional view schematically illustrating an operation of attaching the covering member to the case body.

When assembling airbag apparatus 10 illustrated in FIG. 8, first, airbag 12 is attached to case body 14 with retainer 15. Then, at leading-out port 55 (in a state where the other end portion of tether 40 led out from the state of FIG. 2B is hooked between fixed portion 43 of actuator 41 and variable portion 44 as illustrated in FIGS. 6A and 6B), actuator 41 is fixed to case body 14 (mounted portion 50). Next, as illustrated in FIGS. 1 and 6B, covering member 60 is attached to case body 14 (mounted portion 50) to cover actuator 41.

Covering member 60 is aligned with case body 14 (mounted portion 50), and is pushed into case body 14 in a state where the tip portions of side surface portions 62 and 62 are put on side wall portions 51 and 51 of mounted portion 50. Accordingly, covering member 60 is attached to case body 14 (mounted portion 50).

More specifically, when covering member 60 is pushed into the case body 14 side at a position where narrowing portions 72 and 72 of side surface portions 62 and 62 abut against tip portions of side wall portions 51 and 51, narrowing portions 72 and 72 are pushed open to the outer side along the outer surfaces of side wall portions 51 and 51. By each guide portion 83 being fitted to each slit 77, pushing-in of covering member 60 is guided. First side surface portion 80 comes into contact with claw section 75 and warps to the outer side from warping portion 80a. When covering member 60 is further pushed in until hole portion 74 reaches a position of claw section 75, the warping of first side surface portion 80 disappears, and claw section 75 is engaged with hole portion 74. Second side surface portions 81 and 81 abut against the outer surfaces of side wall portions 51 and 51. As a result, covering member 60 is fixed to case body 14. That is, in a state where covering member 60 is attached to case body 14, opposing portion 61 opposes actuator 41. In addition, side surface portions 62 and 62 are held by case body 14 (mounted portion 50) by claw section 75 being engaged with hole portion 74. Side surface portions 62 and 62 are pressed against case body 14 (side wall portions 51 and 51) at positions of narrowing portions 72 and 72, and thus mounted portion 50 is interposed therebetween. In addition, end surface portion 63 overlaps case body 14 (end wall portion 52).

As a result, as illustrated in FIGS. 1, 2A, 2B, and 7, covering member 60 covers actuator 41 and is easily attached by being pushed into case body 14 (mounted portion 50) in attachment direction D.

After then, airbag 12 is folded, inflator 13 is attached to case body 14, and case body 14 is provided in instrument panel section 11. Each of inflator 13 and actuator 41 is electrically connected to the control apparatus.

Outline of operation of airbag apparatus 10 provided in such a manner is as follows. When the control apparatus operates inflator 13 at the time of automobile collision, inflator 13 ejects a gas. As the gas from gas introduction portion 35 flows in, airbag 12 accommodated in airbag accommodating portion 20 in a folded state inflates and deploys. Airbag 12 ruptures the tear line of the cover body, protrudes from protruding opening 19, and deploys to an occupant A side as illustrated in FIG. 8.

The control apparatus senses a physical status or a sitting state of occupant A by means of the sensor. According to sensing results, tension of tether 40 is changed by the control apparatus maintaining a state where the other end portion of tether 40 is held by actuator 41 without operating actuator 41, or by moving variable portion 44 with respect to fixed portion 43 and releasing the holding of the other end portion of tether 40. As a result, an inflated state of airbag 12 is controlled. In the embodiment, by the control apparatus controlling an open or close amount of the vent hole, the internal pressure of airbag 12 is controlled, and thereby occupant A is appropriately protected.

In Embodiment 1, by covering member 60 being pushed into case body 14 in attachment direction D in this manner, side surface portion 62 is locked into claw section 75. For this reason, covering member 60 is easily and reliably attached to case body 14 on which actuator 41 is mounted. In addition, since opposing portion 61 covers at least a part of actuator 41, actuator 41 is protected.

In Embodiment 1, by side surface portion 62 being pressed against case body 14 in the direction intersecting attachment direction D, covering member 60 is more firmly attached to case body 14.

In particular, by narrowing portion 72 of side surface portion 62 being pressed against case body 14, covering member 60 is more firmly attached to case body 14.

In Embodiment 1, side surface portion 62 has hole portion 74 engaged with claw section 75 provided in case body 14 along the direction intersecting attachment direction D. Accordingly, due to the engagement between hole portion 74 and claw section 75, covering member 60 is firmly held by case body 14 even when there is a pressure at the time of deployment of airbag 12.

In Embodiment 1, slits 77 are provided at the positions where hole portion 74 of side surface portion 62 is interposed therebetween. Accordingly, it is possible for side surface portion 62, which is pushed in case body 14 in attachment direction D at the time of attachment of covering member 60, to elastically deform at a position of including hole portion 74. Accordingly, covering member 60 is more easily attached to case body 14 while deformation of a portion of covering member 60, which is structurally weak, (for example, portion 87 connecting viewing window portion 65 to bent recess portions 68 and 85) is suppressed.

In Embodiment 1, slit 77 is formed from the tip portion of side surface portion 62 along attachment direction D, and is fitted to guide portion 83 of case body 14. Accordingly, when covering member 60 is attached to case body 14, covering member 60 is easily positioned with respect to case body 14, and is guided in attachment direction D due to fitting between slit 77 and guide portion 83. For this reason, covering member 60 is more easily attached to case body 14.

In addition, in Embodiment 1, viewing window portion 65 is formed in opposing portion 61 along the direction intersecting the other end portion of tether 40. Accordingly, the other end portion of tether 40 can be easily checked visually via viewing window portion 65. Therefore, the presence or absence and an attachment state of tether 40 can be easily checked.

Figure 9A:
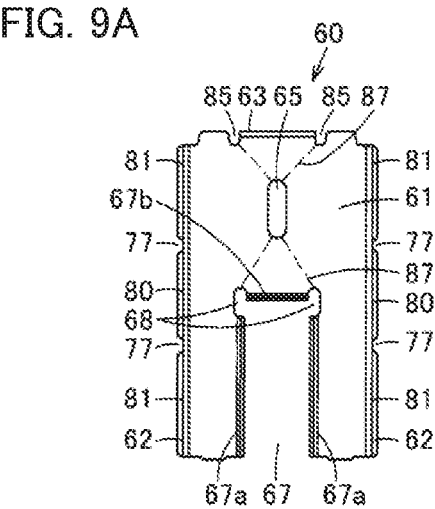
FIG. 9A is a plan view of a covering member according to Embodiment 2 of the present invention.
Figure 9B:
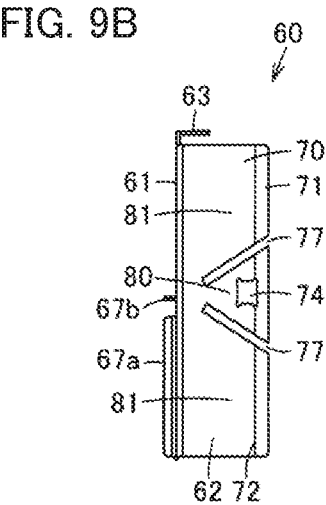
FIG. 9B is a side view of the covering member.
Figure 10:
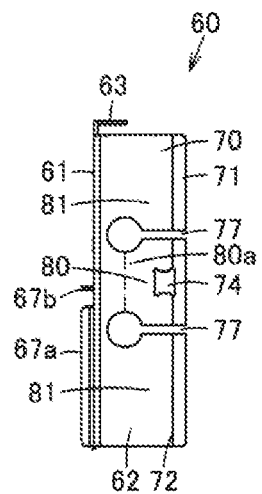
FIG. 10 is a side view of a covering member according to Embodiment 3 of the present invention.

As in Embodiment 2 shown in FIGS. 9A and 9B, slits 77 may be inclined to be gradually brought close to each other from the tip portion to the base end portion of side surface portion 62, a distance of warping portion 80a may be made shorter, and the strength of warping portion 80a may be decreased. In Embodiment 2, when covering member 60 is attached to case body 14 (mounted portion 50), it is likely for warping portion 80a to warp more than the portion of opposing portion 61, which is structurally weak, (for example, portion 87 connecting viewing window portion 65 to bent recess portions 68 and 85) does. For this reason, the deformation of the structurally weak portion can be suppressed. Alternatively, as in Embodiment 3 shown in FIG. 10, slit 77 may have a shape of which a tip portion is enlarged in a circular shape. In Embodiment 3, the same action and effects as Embodiment 2 can be achieved regardless of the strength of warping portion 80a.

Figure 11:
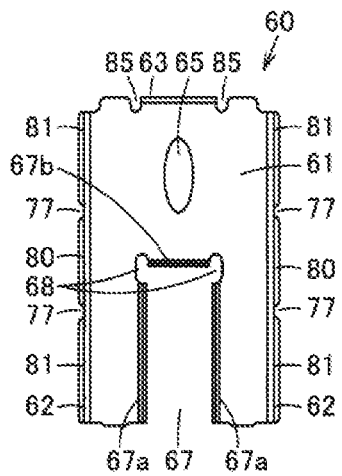
FIG. 11 is a plan view of a covering member according to Embodiment 4 of the present invention.
Figure 12:
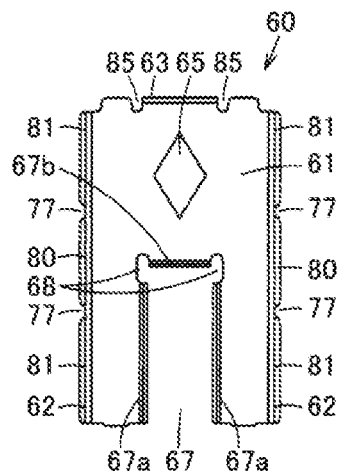
FIG. 12 is a plan view of a covering member according to Embodiment 5 of the present invention.

As in Embodiment 4 shown in FIG. 11, a shape of viewing window portion 65 may be, for example, an elliptical shape. In addition, as in Embodiment 5 shown in FIG. 12, a shape of viewing window portion 65 may be a quadrilateral shape, for example, a rhombus and a parallelogram. That is, viewing window portion 65 may have any shape insofar as the other end portion of tether 40 can be checked from outside covering member 60.

Figure 13:
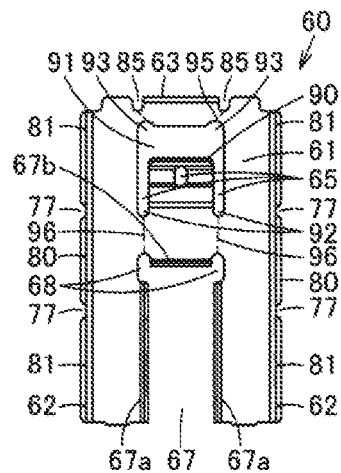
FIG. 13 is a plan view of a covering member according to Embodiment 6 of the present invention.

As in Embodiment 6 shown in FIG. 13, viewing window portion 65 may be formed, for example, in bending portion 90 which is adjacent to opening portion 67 and is bent in opposing portion 61 toward actuator 41. In Embodiment 6, bent recess portions 92 and 93 for crack prevention at the time of bending of bending portion 90 are notched in four corners of cavity portion 91 formed in opposing portion 61 due to bending of bending portion 90. Accordingly, also bent recess portion 92 positioned on the side of viewing window portion 65 acts as a viewing window portion. That is, the number of viewing window portions 65 is not limited to one, and there may be a plurality of viewing window portions. In Embodiment 6, for example, portion 95 that connects bent recess portions 68 to bent recess portion 92 and portion 96 that connects bent recess portion 85 to bent recess portion 93 are also structurally weak portions of opposing portion 61, and stress is likely to concentrate on these portions 95 and 96 when attaching covering member 60 to case body 14 (mounted portion 50). In this case, at the time of attachment of covering member 60, deformation of the structurally weak portions can be suppressed by combining the configurations of Embodiment 2 and Embodiment 3.

Figure 14:
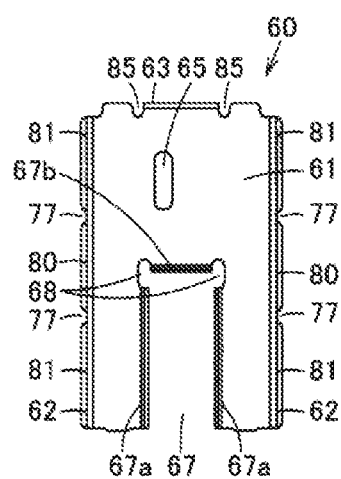
FIG. 14 is a plan view of a covering member according to Embodiment 7 of the present invention.

In addition, as in Embodiment 7 shown in FIG. 14, it is not necessary for viewing window portion 65 to be positioned in the middle of covering member 60 in the width direction of opposing portion 61, and for example, the viewing window portion 65 may be disposed to be biased to one side of opposing portion 61 of covering member 60.

Although airbag apparatus 10 for a passenger seat is described in each embodiment, the invention can be applied to, for example, an airbag apparatus for a driver's seat and any other airbag apparatuses.

INDUSTRIAL APPLICABILITY

The present invention is suitable as, for example, an airbag apparatus for a vehicle, such as an automobile, and a covering member attached to a case body thereof.

REFERENCE SIGNS LIST 10 airbag apparatus
12 airbag
14 case body which is counterpart member
40 tether which is connecting member
41 actuator
60 covering member
61 opposing portion
62 side surface portion
65 viewing window portion
72 narrowing portion
74 hole portion
75 claw section
77 slit
83 guide portion
D attachment direction

What is claimed is:

1. A covering member that is attached to a counterpart member, on which an actuator detachably holding one end portion of a connecting member having another end portion connected to an airbag is mounted, and covers the actuator, the covering member comprising:
    an opposing portion that opposes at least a part of the actuator in an attachment direction to the counterpart member; and
    a side surface portion that is formed to extend from the opposing portion in the attachment direction and is locked and held by being pushed into the counterpart member in the attachment direction, wherein
    the side surface portion includes slits at positions interposing the hole portion therebetween.

2. The covering member according to claim 1, wherein the side surface portion is pressed against the counterpart member in a direction intersecting the attachment direction.

3. The covering member according to claim 2, wherein the side surface portion includes a narrowing portion that narrows in the direction intersecting the attachment direction and is pressed against the counterpart member.

4. The covering member according to claim 2, wherein the side surface portion includes a hole portion that is engaged with a claw section projecting on the counterpart member along the direction intersecting the attachment direction.

5. The covering member according to claim 1, wherein the slits are formed from a tip portion of the side surface portion in the attachment direction, and is fitted to a guide portion provided in the counterpart member along the attachment direction.

6. The covering member according to claim 1, further comprising:
   a viewing window portion formed in the opposing portion along a direction intersecting a directing direction of the one end portion of the connecting member.

7. An airbag apparatus comprising:
   an airbag;
   a case body that is the counterpart member accommodating the folded airbag;
   the actuator that is mounted on the case body; and
   the covering member according to claim 1, which covers the actuator and is attached to the case body.

* * * * *